Dec. 8, 1931.  E. E. GREVE  1,835,153

CLUTCH FOR REVERSING MECHANISM

Filed Dec. 30, 1926  2 Sheets-Sheet 1

INVENTOR
E. E. Greve
by W. J. Doolittle
Attorney.

Dec. 8, 1931.  E. E. GREVE  1,835,153

CLUTCH FOR REVERSING MECHANISM

Filed Dec. 30, 1926  2 Sheets-Sheet 2

INVENTOR
E. E. Greve
by W. G. Doolittle
Attorney

Patented Dec. 8, 1931

1,835,153

UNITED STATES PATENT OFFICE

EDGAR E. GREVE, OF BELLEVUE, PENNSYLVANIA, ASSIGNOR, BY MESNE ASSIGNMENTS, TO OIL WELL SUPPLY COMPANY, OF PITTSBURGH, PENNSYLVANIA, A CORPORATION OF NEW JERSEY

CLUTCH FOR REVERSING MECHANISM

Application filed December 30, 1926. Serial No. 157,934.

My invention relates to a clutch for reversing mechanism, and more particularly to a clutch for reversing pulley mechanism designed to be used in connection with engines employed in the oil fields during the drilling of and the operation of wells. A clutch for reversing pulley mechanism of this character is embodied in an application for patent filed by me December 24, 1925, Serial No. 77,673.

The present invention has among its objects to provide a pair of self-compensating clutch devices; new and improved clutch actuating means embodied in a single slidable unit; a shaft construction having clutch member receiving means formed integral therewith; and a construction in which the clutch devices and their cooperating actuating means are all enclosed within the clutch pulley.

Figure 1:
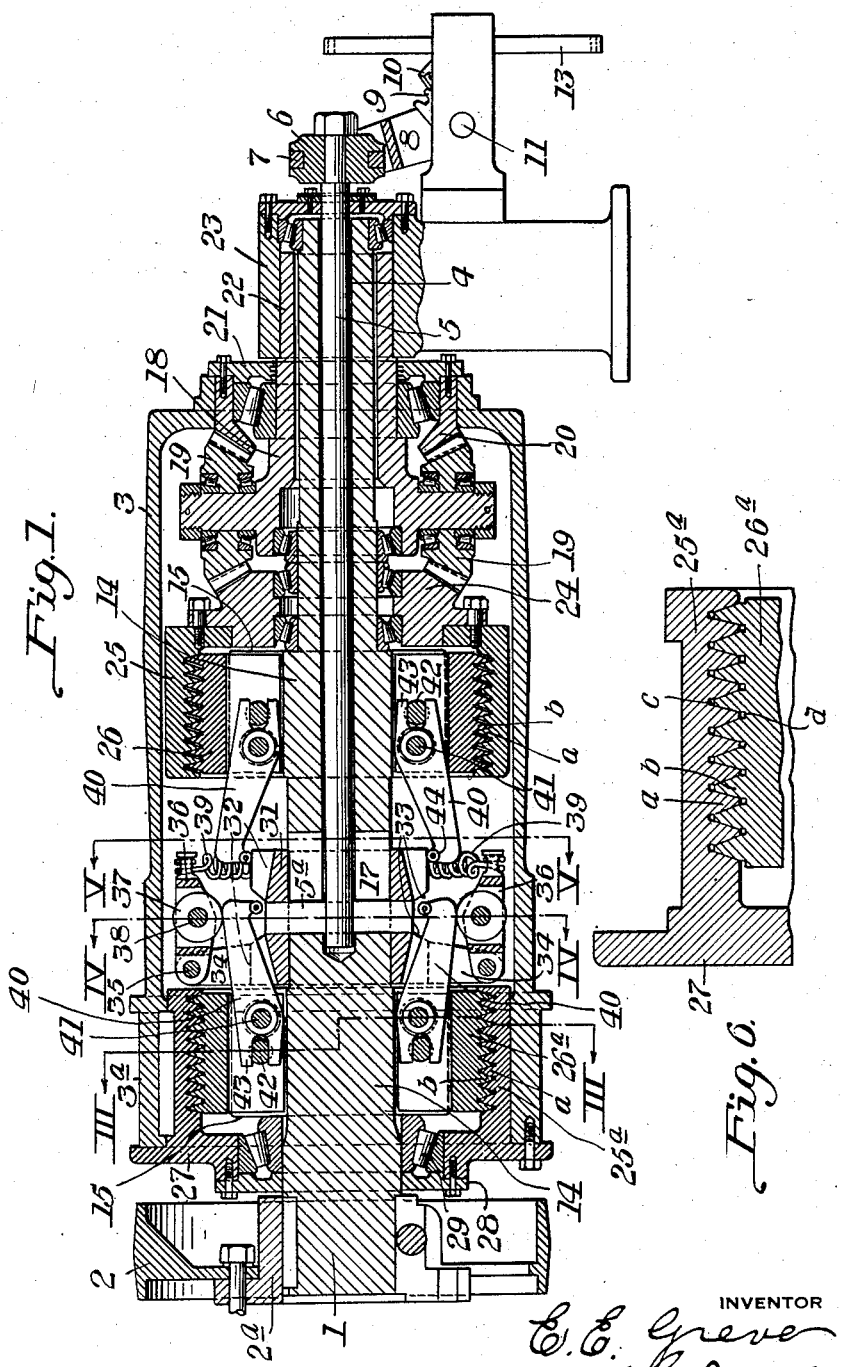
Figure 2:
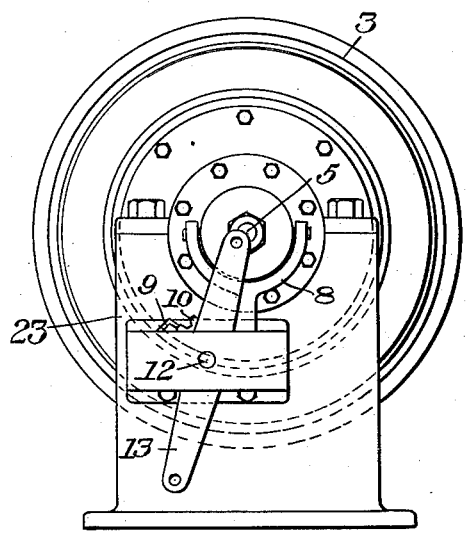
Figure 3:
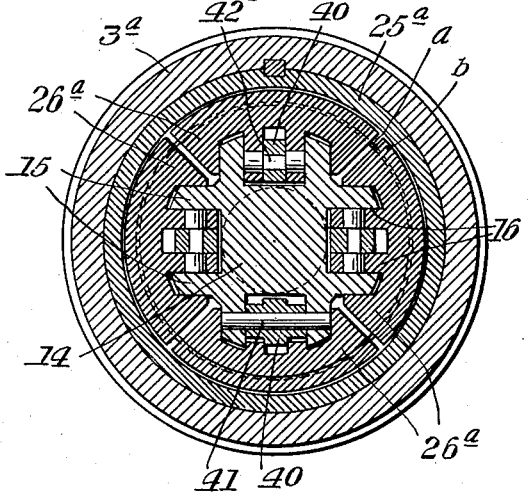
Figure 4:
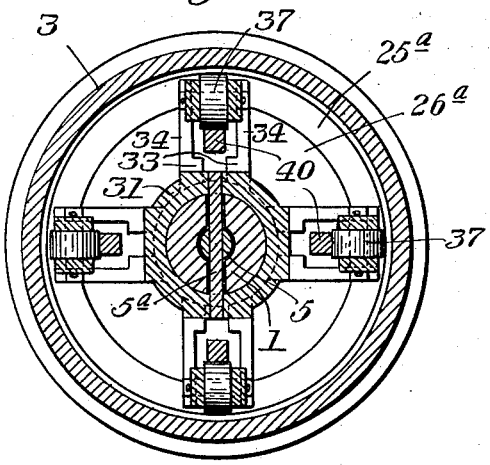
Figure 5:
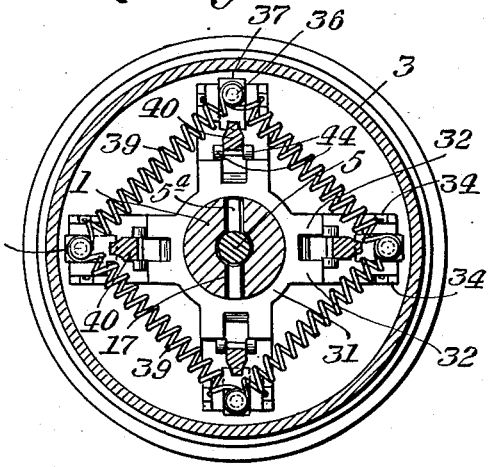

In the accompanying drawings, which illustrate an application of my invention:

Fig. 1 is a part elevational view and a part longitudinal sectional view;

Fig. 2, an end view looking from the right of Fig. 1;

Figs. 3, 4 and 5, cross sectional views, respectively taken on lines III—III, IV—IV and V—V of Fig. 1; and Fig. 6, a detail sectional view particularly showing portions of a clutch member and a shoe and their cooperating contact portions.

Referring to the drawings, 1 designates the main or driving shaft of the reversing clutch mechanism which is designed to be coupled with the drive shaft of an engine, not shown, and 2 is a pulley wheel fixedly connected to the shaft 1 through a coupling member 2a. This pulley 2 is a power take-off means and for instance may be employed for driving a pump or other mechanism not shown.

3 designates another power take-off means and is the main pulley or housing of the reversing clutch mechanism and, as shown, the housing or pulley 3 is formed with a brake band portion 3a. As illustrated and as preferred, shaft 1 is formed with a longitudinally extending bore 4 adapted to receive a clutch operating rod or shaft 5, said shaft 5 having its outer end positioned in a bearing block 6, the latter being carried on a clutch block yoke 7. As illustrated, operating rod 5 is designed to be moved inwardly and outwardly of the structure by means of a link 8, co-operating bevel gear sectors 9 and 10, shafts 11 and 12, and an operating lever 13.

The construction of the driving shaft 1 constitutes an important and characteristic feature of my invention. As illustrated, the shaft, for portions of its length, as indicated by the numeral 14, has non-circular cross sections and is formed with two spaced-apart series of projections 15, said projections being arranged to form clutch member receiving channels or spaces 16, see Fig. 3. In addition to these parts, the shaft is provided with a longitudinally extending bar or pin-receiving slot 17 adapted to receive a pin 5a carried by operating rod 5.

Located within the housing or main pulley 3, I provide a pinion spider 18, this spider being designed to carry two pinions 19. Pinions 19 are arranged to cooperate with a bevel gear member 20 carried on a closure member 21. Member 21 also functions to close one end of the pulley 3. Spider 18 has an elongated portion 22 projecting outwardly from pulley 3 and its outer end is secured in a pedestal 23.

Disposed on the opposite side of the spider 18, and designed to cooperate with the pinions 19, is a second bevel gear 24, gear 24 being attached to an annular clutch block member 25. Clutch member 25 is designed to cooperate with clutch block shoes 26, the said members 25 and 26 each being formed with toothed portions a and b respectively, and with spaces c and d, the latter being designed to prevent trapping of oil.

The clutch mechanism, operable when it is desired to rotate the driven pulley 3 in the direction of rotation of the engine shaft or other prime mover, and located at the opposite end of the pulley from the clutch mechanism just described, includes a clutch member 25a and four clutch shoes 26a. In this instance, clutch member 25a is formed integral with a closure member 27, the latter being provided with a cap 28. 29 designates roller bearings.

The means for moving the clutch mechanisms into and out of operative engagement include a slidable member or spider 31 slidably mounted on the main shaft 1, said member 31 being connected with the operating rod 5 by means of the pin 5a.

Member 31 is formed with contact lugs 32 and each lug is provided with an inclined face 33; the function of these lugs will be described in connection with the operation of the device. In addition to the contact lugs, member 31 carries, at one end thereof, a series of radially projecting fulcrum members 34. These arms or members 34 are designed to have connected thereto, by pins 35, a series of movable arms or levers 36 carrying contact rollers 37 mounted thereon by pins 38. 39 designates a series of springs secured to ends of the movable arms 36, whereby the respective arms are connected.

Located on opposite sides of the actuating member 31, and designed to be moved by means of the contact rollers 37, I provide a series of pivotally mounted levers 40. Levers 40 are pivotally secured to the projections 15, formed on the non-circular portions 14 of the main shaft 1, by means of pins 41 and are connected with the respective clutch shoes 26 and 26a by means of rods 42 carried by the shoes. Rods 42 are formed with flattened portions adapted to be entered in the divided end portions 43 of the said levers 40. 44 designate roller contacts carried by levers 40, and are designed to engage the contact lugs 32.

In operation, it will be seen that a movement of member 31 carrying the arms 36 causes the contact rollers 37 to bear upon either one series of levers 40 or the other, depending on the direction the member is moved. Pressure exerted on the levers 40 will cause them to move inwardly, and thereby cause the movable shoe members to be moved into operative engagement with the clutch members 25 or 25a, due to the action of the springs 39 and the connections with said shoes through rods 42.

The respective series of levers 40 are held out of operative positions by means of the contact lugs 32, for it is evident that, as member 31 is moved, the free ends of one or the other series of levers will travel up the inclined faces 33 of lugs 32 and, after passing said faces, will rest on the outer faces of the lugs, thus preventing the levers moving inwardly.

From the construction described, it will be noted that the clutch mechanism is self-compensating and that no adjustment is necessary to take care of any wear.

What I claim is:

1. In a clutch mechanism, a driving shaft, a rotatable hollow pulley freely mounted on the shaft, self-compensating clutch device having a movable clutch member mounted on the shaft, said clutch device including a lever pivotally supported on the shaft with a free end, a cross member carried by the movable clutch member arranged to cooperate with the opposite end of the lever, a clutch actuating member slidably mounted on the shaft, means carried by the actuating member for moving the lever including a spring controlled member engageable with the free end of the lever by movement into overlapping relationship therewith, all disposed within the hollow pulley, and means for slidably moving the actuating member including a rod operatively mounted in the driving shaft.

2. In a clutch mechanism, a driving shaft, a self-compensating clutch device having a movable clutch member mounted on the shaft, said clutch device including a lever pivotally supported on an integral portion of the shaft, a cross bar carried by the movable clutch member arranged to cooperate with the lever, a clutch operating spider slidably mounted on the shaft, spring controlled means including a pivoted arm mounted on the spider and arranged to make contact with the lever for moving it, and means for slidably moving the spider.

3. In a clutch mechanism, a driving shaft, a self-compensating clutch device having a movable clutch member mounted on the shaft, said clutch device including a lever pivotally supported on the shaft, a cross bar carried by the movable clutch member arranged to cooperate with the lever, a clutch operating spider slidably mounted on the shaft, spring controlled means including a pivoted arm having a roller contact arranged to make contact with the lever for moving it, and means for slidably moving the spider.

4. In a clutch mechanism, a pulley, a driving shaft having clutch member receiving elements formed integral therewith, a clutch device having a clutch member operatively mounted between said elements, a pin between and carried by said elements, said clutch device including a lever pivotally mounted on said pin and adjacent one end engaging the clutch member, a clutch operating spider slidably mounted on the shaft for engagement with the other end of said lever, spring controlled means carried by the spider for moving the lever, and means for slidably moving the spider.

5. In a clutch mechanism, a driving shaft, a rotatable pulley freely mounted on the shaft, a clutch device including a clutch block, a clutch shoe receiving portion formed integral with the shaft, a clutch shoe on the receiving portion having a pin therein, a lever pivotally mounted on the shaft and arranged to engage the shoe pin, a roller bearing at one end of the lever, clutch actuating mechanism including a spider having a contact lug for the lever, and a spring controlled arm having a roller contact member engaging the said lever, and means for moving the spider.

6. In a clutch mechanism, a driving shaft, a rotatable pulley freely mounted on the shaft, a clutch device including a clutch block, a clutch shoe positioned by said block, a lever pivoted on the shaft and arranged to engage the shoe, clutch actuating mechanism including a spider having a cam surface adapted to contact with the lever, and a spring-urged arm pivotally carried by the spider urging inward movement of the adjacent end of said lever, and means for moving the spider.

7. In a clutch mechanism, in combination with a driving shaft, a pair of spaced clutches to control operation of a device in opposite directions, each clutch including a section movable radially of the shaft, levers pivoted to said shaft and having free ends adjacent each other, one lever being operatively connected to each movable section, and means overlapping the free ends and overlapped by said ends movable axially of the shaft to cause one section to move toward the shaft as the other section moves away from the shaft.

8. In a clutch mechanism, in combination with a driving shaft, a pair of spaced clutches to control operation of a device in opposite directions, each clutch having an outer clutch section and an inner clutch section, said inner clutch sections being movable radially in opposite directions with respect to the shaft to engage and disengage the outer clutch sections, pivoted levers operatively connected to the inner clutch sections and operating mechanism for said movable clutch sections including a part having a movement axially of said shaft under the levers and a part movable over the levers to cause the aforesaid radial movement of the inner clutch sections.

In testimony whereof I affix my signature.
EDGAR E. GREVE.